(12) United States Patent
Oget

(10) Patent No.: US 8,289,138 B2
(45) Date of Patent: Oct. 16, 2012

(54) WIRELESS COMMUNICATIONS UNIT OPERATING AS A TAG WHEN A HOST DEVICE IS TURNED OFF

(75) Inventor: Guillaume Oget, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 784 days.

(21) Appl. No.: 12/263,420

(22) Filed: Oct. 31, 2008

(65) Prior Publication Data

US 2009/0189737 A1    Jul. 30, 2009

Related U.S. Application Data

(60) Provisional application No. 61/024,305, filed on Jan. 29, 2008.

(51) Int. Cl.
*H04Q 5/22* (2006.01)

(52) U.S. Cl. ............ 340/10.1; 340/10.2; 340/10.3; 340/10.31; 340/10.32; 340/10.33; 340/10.34; 340/10.4; 340/10.41; 340/10.42; 340/10.5; 340/10.51; 340/10.52; 340/10.6; 235/375; 235/376; 235/377; 235/378; 235/379; 235/380; 235/381; 235/382; 235/382.5; 235/383; 235/384; 235/385

(58) Field of Classification Search ........ 340/10.1–10.6, 340/572.1–572.9; 235/375–385
See application file for complete search history.

(56) References Cited

U.S. PATENT DOCUMENTS

| | | | | |
|---|---|---|---|---|
| 6,985,757 B2 * | 1/2006 | Liu et al. | ...................... | 455/558 |
| 7,084,738 B2 * | 8/2006 | Bastian, II | ................... | 340/5.92 |
| 7,257,107 B2 * | 8/2007 | Swier et al. | ................... | 370/338 |
| 7,262,685 B2 * | 8/2007 | Bastian, II | ................... | 340/5.92 |
| 7,271,674 B1 * | 9/2007 | Butenhoff et al. | ............. | 331/183 |
| 7,437,585 B2 * | 10/2008 | Nakano et al. | ................ | 713/330 |
| 7,577,261 B2 * | 8/2009 | Liu et al. | ......................... | 381/77 |
| 7,768,389 B2 * | 8/2010 | Frank | ............................. | 340/531 |
| 2002/0174254 A1 * | 11/2002 | Kita et al. | ..................... | 709/250 |
| 2004/0032308 A1 * | 2/2004 | Cheung et al. | .................. | 333/26 |
| 2004/0207512 A1 * | 10/2004 | Bastian, II | ................... | 340/5.92 |
| 2005/0015536 A1 * | 1/2005 | Lee | ................................ | 710/313 |
| 2005/0030929 A1 * | 2/2005 | Swier et al. | ................... | 370/338 |
| 2005/0140498 A1 * | 6/2005 | Bastian, II | ................... | 340/5.92 |
| 2006/0026297 A1 * | 2/2006 | Kung et al. | .................... | 709/239 |
| 2006/0174150 A1 * | 8/2006 | Nakano et al. | ................ | 713/330 |
| 2007/0171201 A1 * | 7/2007 | Pi et al. | ......................... | 345/157 |
| 2007/0229926 A1 * | 10/2007 | Morisaki et al. | ............. | 358/527 |
| 2008/0065792 A1 * | 3/2008 | Wu et al. | ......................... | 710/16 |
| 2008/0139117 A1 * | 6/2008 | Madine et al. | ............... | 455/41.2 |
| 2008/0141073 A1 * | 6/2008 | Shih et al. | ....................... | 714/36 |

(Continued)

FOREIGN PATENT DOCUMENTS

JP        11338739 A    * 12/1999
(Continued)

*Primary Examiner* — George Bugg
*Assistant Examiner* — Paul Obiniyi

(57) ABSTRACT

A wireless network communications unit is operable to transmit and receive data for a host device. The wireless network communications unit includes a wireless network communications interface configured to transmit and receive data using a wireless network protocol when a host device having the wireless network communications unit is turned on. The wireless communications unit also includes a tag component detecting when the host device is turned off. In response to detecting the host device being turned off, the unit enters a tag operational mode wherein the tag component is configured to transmit data identifying the host device via the wireless network interface.

18 Claims, 4 Drawing Sheets

U.S. PATENT DOCUMENTS

| | | | |
|---|---|---|---|
| 2009/0003828 A1* | 1/2009 | So | 398/56 |
| 2009/0006675 A1* | 1/2009 | Rofougaran | 710/62 |
| 2009/0102655 A1* | 4/2009 | Yi et al. | 340/572.1 |
| 2009/0201529 A1* | 8/2009 | Takahara | 358/1.15 |
| 2009/0256684 A1* | 10/2009 | Fukuda | 340/10.3 |
| 2010/0027523 A1* | 2/2010 | Chan et al. | 370/345 |
| 2010/0052854 A1* | 3/2010 | Jeun | 340/5.85 |
| 2010/0248783 A1* | 9/2010 | Jolivet | 455/558 |

FOREIGN PATENT DOCUMENTS

| | | | |
|---|---|---|---|
| KR | 2002027393 A | * | 4/2002 |

* cited by examiner ns unit as a
WIRELESS COMMUNICATIONS UNIT OPERATING AS A TAG WHEN A HOST DEVICE IS TURNED OFF

CROSS-REFERENCE TO RELATED APPLICATION

The present application claims priority from provisional application Ser. No. 61/024,305, filed Jan. 29, 2008, the contents of which are incorporated herein by reference in their entirety.

BACKGROUND

The demand for tracking laptops and other mobile equipment is very high in many organizations, especially financial organizations and the federal government. Tracking is performed for many purposes including to prevent theft, for inventory, and to prevent the unauthorized access or transport of data from secure areas. For example, many financial institutions require employees and visitors to record their laptop serial numbers when entering and exiting the premises in an attempt to provide physical monitoring of laptops.

Some current equipment tracking systems use serial numbers to track their equipment. For example, large organizations that provide mobile devices, such as laptops, for their employees manual record serial numbers of the devices, for example, when the employees enter or exit the site. Some organizations are looking at passive RFID tags to automate this procedure. For example, passive RFID tags are affixed to the laptops, and RFID tag readers are installed at various locations of a building, such as at exits/entrances of a building or at other locations in a building. These tracking systems allow the equipment to be tracked even when turned off. For example, as the laptops pass in the vicinity of the readers, the serial numbers of the tags are read. For each reading of a tag, the location and timestamp are recorded, so the laptop can be tracked. In addition to laptops, other types of electronic equipment or non-electronic equipment can be tracked in the same manner by affixing RFID tags to the equipment.

These type of tracking systems are limited in that the equipment can only be tracked at the locations of the readers. Thus, for example, if someone carried a laptop through an exit with no reader, there would be no tracking data for that event. As an alternative, active RFID tags may be used that have a greater range than passive RFID tags, so readers may be used to cover a larger area. However, active RFID tags are bulkier than passive RFID tags and are also much more expensive.

Many electronic devices already come equipped with wireless transceiver capability, but this wireless transceiver capability cannot be leveraged for tracking the electronic devices. For example, electronic devices that are typically tracked, such as laptops, cell phones, personal digital assistants (PDAs), etc., typically utilize a wireless network card to access a network or another device. For example, laptops, many cell phones and PDAs include a WiFi network interface and/or a BLUETOOTH interface for accessing a network and/or another device wirelessly. However, when these electronic devices are turned off, the WiFi network interface and/or a BLUETOOTH interface are also turned off. Thus, these wireless interfaces cannot be used to send or receive signals for tracking when the devices are turned off.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a multimode wireless communications unit is operable to send and receive data for a host device in one mode and in a tag operational mode, the wireless communications unit functions as a tag to transmit data identifying the host device. The tag operational mode is entered when the host device is turned off or the wireless communications unit is turned off. The tag operational mode may be used for tracking the host device. Thus, the wireless communications unit may function as a conventional network card when the host device is on and may function as a tag when the host device is off. Hence, another separate unit, such as an RFID tag affixed to the host device, is not required for tracking the host device. Also, the wireless communication unit is functional to provide host identification data for tracking even when the host device is off.

Figure 1:
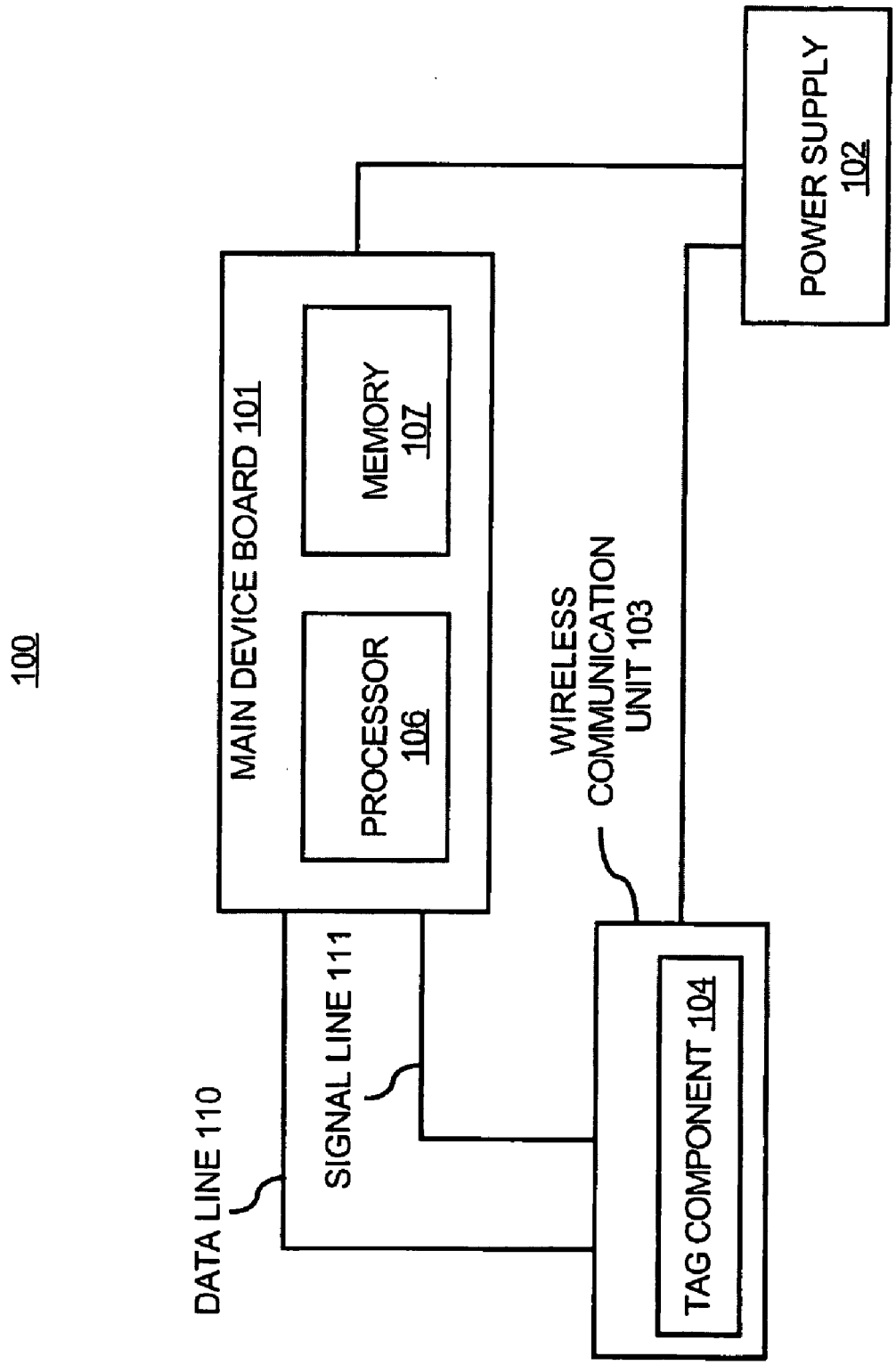
FIG. 1 illustrates a host device with a wireless communications unit, according to an embodiment.

FIG. 1 illustrates a host device 100 with a wireless communications unit according to an embodiment. The host device 100 may include any electronic device. For example, the host device 100 may include a mobile computer system or other type of mobile electronic device, such as a laptop, PDA, cell phone, camera, etc. Other examples of the host device 100 include a personal computer, server, printer, etc. FIG. 1 only shows some components of the host device 100 for purposes of describing the embodiments, and it will be apparent to one of ordinary skill in the art that the host device 100 may include many other known components that are not shown.

The host device 100 also includes a main device board 101, a power supply 102 and a wireless communications unit 103. The main device board 101 may include components of the host device, such as a processor 106, memory 107 and other circuits. When the host device 100 is on, the host device 100 uses the wireless communications unit 103 to send and receive data wirelessly. For example, the wireless communication unit 103 operates as an interface to a wireless network, and the processor 106 uses the wireless communication unit 103 to transmit data over the wireless network to other devices or receive data from other devices via the wireless network. The wireless communications unit 103 is operable to use the wireless protocol of the network to send and receive data. For example, the wireless communications unit may use WiFi, BLUETOOTH or another wireless network protocol to send and receive data via the wireless network.

The wireless communications unit 103 may be connected to the main device board 101 via a data line 110 and a signal line 111. The data line 110 is for sending and receiving data between the main device board 101 and the wireless communications unit 103. The data line 110 may include a bus shared by multiple components of the host device 100.

The signal line 110 provides a signal to the wireless communications unit 103 indicating whether the host device 100 is on. For example, if the main device board 101 is on, it may drive the signal line 110 "high" indicating to the wireless communications unit 103 that the host device 100 is on. If the main device board 101 is off, the signal line 110 is "low" indicating the host device 100 is off.

Figure 2:
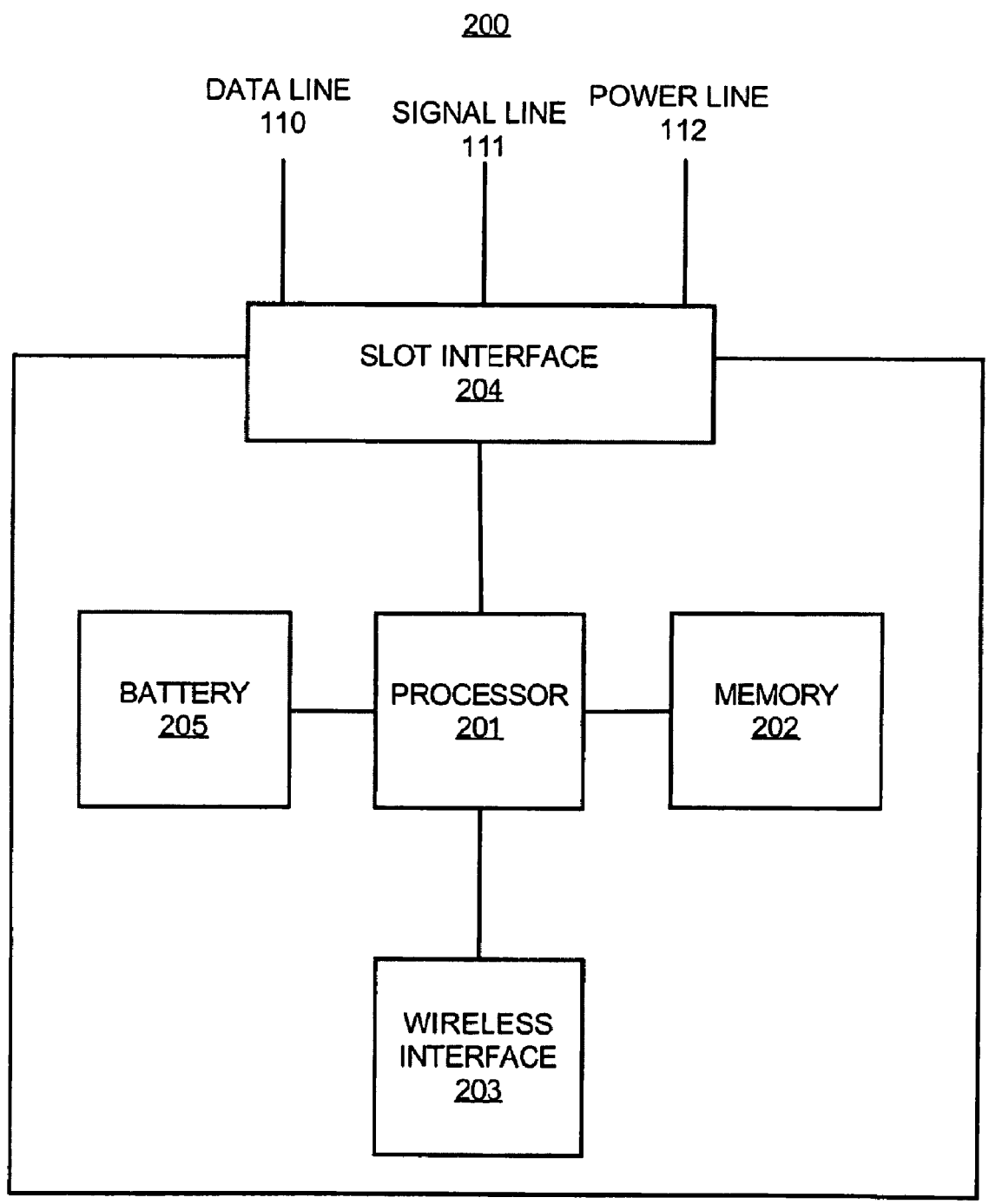
FIG. 2 illustrates a wireless communications unit as a network card, according to an embodiment.
Figure 3:
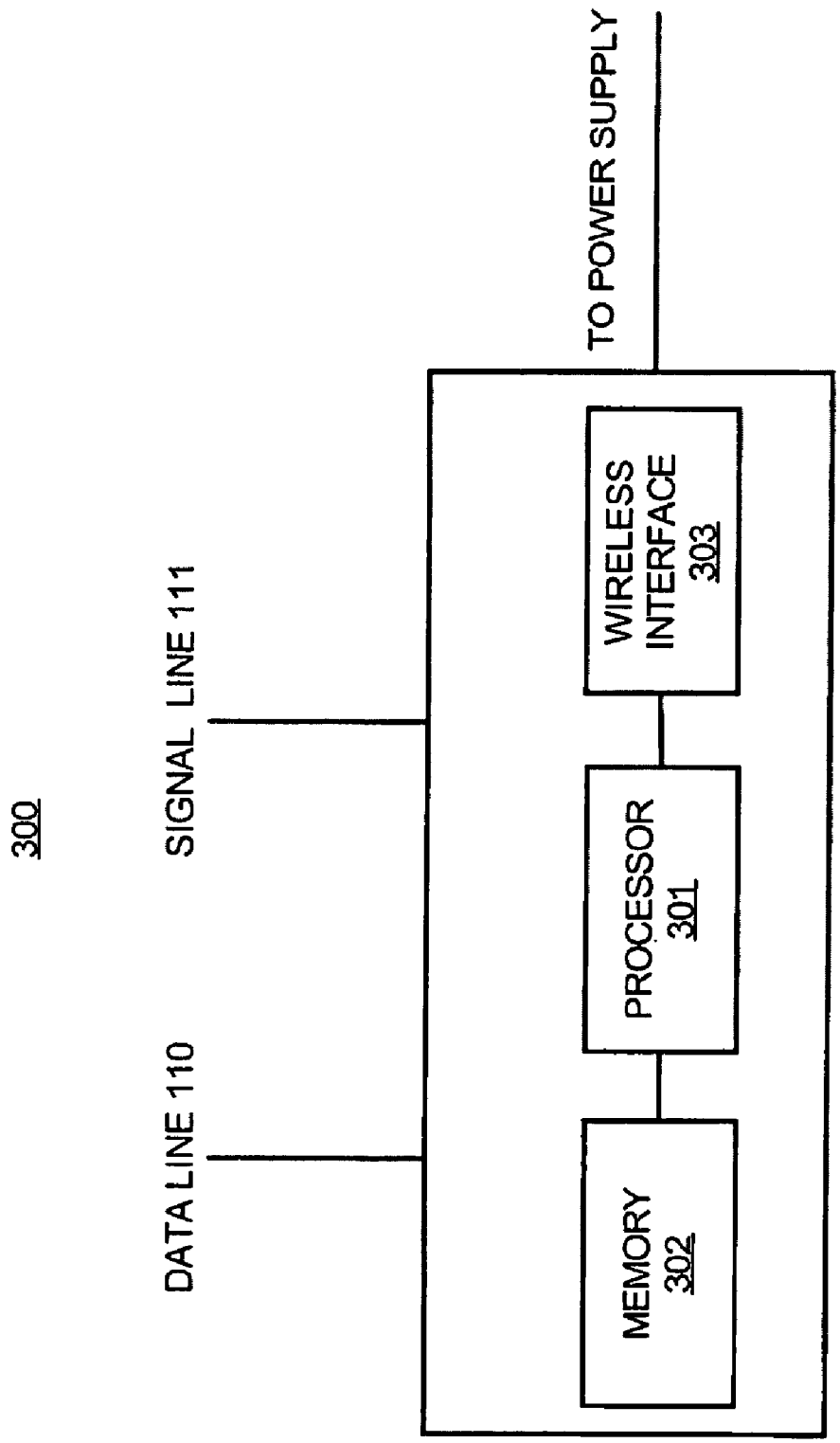
FIG. 3 illustrates a wireless communications unit as a circuit internal to a host device, according to an embodiment.

The host device 100 is considered on when the main device board 101 or other components, such as a processor, are operable to send and receive data using the wireless communications unit 103. For example, when the host device 100 is powered up, it is operational to send and receive data using the wireless communications unit 103. The host device 100 may be in a low power state but still may be able to send and receive data using the wireless communications unit 103 and is considered on. When the host device is on, the wireless communications unit 103 operates as a conventional wireless network card. The wireless communications unit 103 includes a tag component 104 that is operable to determine whether the host device 100 is on and whether the wireless communications unit 103 is on based on a user setting. In some embodiments, the tag component 104 includes a processor and memory as shown in FIGS. 2 and 3.

It should be noted that for certain host devices, the wireless communications unit 103 may be turned off even if the host device 100 is on. These devices may have a setting that can be toggled by a user to enable or disable a wireless network interface. For example, laptops typically include a button allowing a user to turn off the wireless network card and/or BLUETOOTH interface even when the laptop is on. In these instances, the signal line 110 may be used to indicate to the wireless communications unit 103 when both the host device 100 is on and the wireless communications unit 103 is on or off depending on a user setting or switch. The signal line 110 may comprise one or more signal lines. If one or more signals on the signal lines indicate that both the host device 100 is on and the wireless communications unit 103 is on, then the wireless communications unit 103 operates as a conventional wireless network card and is operable to send and receive data via the wireless network based on a predetermined wireless protocol.

If one or more signals on the signal lines indicate that the host device 100 is off or the wireless communications unit 103 is off, for example, based on a user setting indicating the wireless communications unit 103 is off, then the wireless communications unit 103 operates in tag operational mode. In tag operational mode, the wireless communications unit 103 transmits data identifying the host device 100 wirelessly in the network. The identification data may be broadcasted or transmitted to particular devices. For example, the data may be sent to any access points in the wireless network that are in range or to other devices that can collect data for tracking devices. The data identifying the host device includes at least some data that is unique to the host device. One example of the unique data may include a MAC address, but other types of unique data may be used. In addition to the unique data, other data for tracking may be transmitted and stored, such as a timestamp of when the unique data was received and a location of the device receiving the data. Location data and a timestamp may also be transmitted in tag operational mode if that data is available. After the wireless communications unit 103 determines that the host device 100 is on and the wireless communications unit 103 is on, the wireless communications unit 103 resumes operation as a conventional network card. It should be noted that in the tag operational mode, the tag component may only be able to transmit data-stored in a memory for the tag component that receives power when the host device 100 is off. The data stored in the memory for the tag component may only include the data identifying the host device and/or other data described above.

The wireless communications unit 103 and the main device board 101 are connected to a power supply 102. The power supply 102 may include a power supply connected to an adapter that is plugged into a wall outlet. The power supply 102 may include a battery. For example, the battery provides power when power from a wall outlet is not available. The battery may be charged when the host device 100 is connected to the wall outlet.

The wireless communications unit 103 is connected to the power supply 102 and can receive power from the power supply 102 even if the host device 100 is off. For example, the main device board 101 may be off, but the wireless communications unit 103 can function in the tag operational mode using power from the power supply 102. The wireless communications unit 103 may have its own power supply or may use the power supply of the host device 100.

The wireless communications unit 103 may be an internal circuit in the host device 100 or may be a network card, e.g., PCI, MINIPCI, CNR, etc., connected to a slot on the host device 100. FIG. 2 shows the wireless communications unit 103 as a network card 200, according to an embodiment. The network card 200 is connected to the host device 204 via a slot interface 204. The slot interface 204 may include a connector including pins as is known in the art. The pins are connected to data, signal and power lines, which may include the data line 110 and the signal line 111 shown in FIG. 1.

The network card 200 includes a processor 201, a memory 202 and a wireless interface 203. The processor 201 determines whether the host device 100 is on and whether the wireless network card 200 is supposed to be on, for example, based on signals received via the slot interface 204. If the host device 100 is on and the wireless network card 200 is supposed to be on, the wireless network card 200 is operable to receive data from the host device 100 and send the data to other devices wirelessly using a predetermined wireless protocol. Also, the network card 200 is operable to receive data from other devices via a wireless local area network in the predetermined protocol and send the data to the host device 100 via the slot interface 200.

If the host device 100 is off or the network card 200 is off, the network card 200 operates in the tag operational mode. In this mode, the processor 201 sends data identifying the host device 100 and possibly other tracking data, as described above. The memory 202 stores the data identifying the host device 100 and other tracking data if provided. The memory 202 may also store code running on the processor 201 for providing the tag operational mode and the conventional network card operating mode. The memory 202 may include volatile and/or non-volatile memory. The wireless interface 203 includes an antenna and conventional digital signal processing circuitry as needed for sending and receiving data over the wireless network. The network card 200 may include a battery 205. If the battery 205 is not provided, the network card 200 receives power from the power supply of the host device 100.

FIG. 3 illustrates the wireless communications unit 103 as a circuit 300 internal to the host device 100, rather than being a network card connected via a slot. The internal circuit 300 includes a processor 301, a memory 302 and a wireless interface 303 that operate the same as the processor 201, the memory 202 and the wireless interface 203 except the internal circuit is not connected via a slot.

Figure 4:
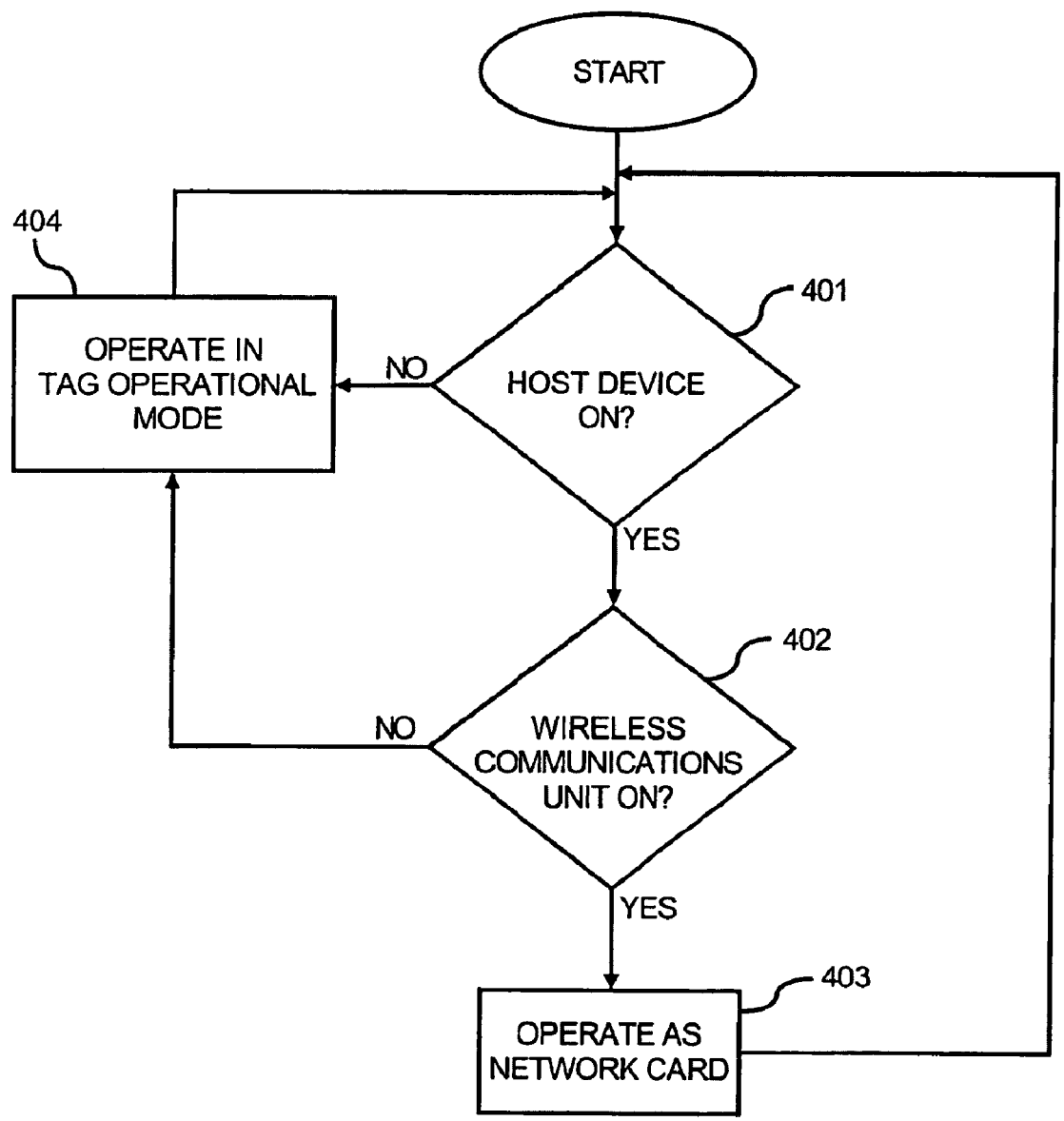
FIG. 4 illustrates a flowchart of a method for operating a wireless communications unit, according to an embodiment.

FIG. 4 illustrates a method 400 for operating a wireless communications unit, according to an embodiment. The method 400 is described with respect to one or more of FIGS. 1-3 by way of example and not limitation.

At step 401, the wireless communications unit 103 determines whether the host device 100 is on. If the host device 100 is off, then the wireless communications unit 103 operates in tag operational mode at step 404 and transmits host identifying data and other tracking data if available.

At step 402, the wireless communications unit 103 determines whether the wireless communications unit is on, for example, based on a user setting. If the wireless communications unit is off, then the wireless communications unit 103 operates in tag operational mode at step 404 and transmits host identifying data and other tracking data if available.

If both the host device 100 is on and the wireless communications unit 103 is on, the wireless communications unit 103 operates as a conventional network card at step 403.

Some host devices may not have a user setting that allows the wireless communications unit to be turned off when the host device is on. For these devices, step 402 is omitted.

One or more of the steps of the method 400 and other steps described herein may be implemented as software embedded on a computer readable medium, such as memory, and executed for example, by a processor. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the scope of the claimed embodiments.

What is claimed is:

1. A wireless network communications unit operable to transmit and receive data using a wireless network protocol, the unit comprising:
   a wireless network communications interface configured to transmit and receive data using the wireless network protocol when a host device having the wireless network communications unit is turned on; and
   a tag component detecting when the host device is turned off, and in response to detecting the host device being turned off, entering a tag operational mode wherein the tag component transmits data identifying the host device via the wireless network interface,
   wherein the tag component detects signals from the host device indicative of the host device being turned off or the wireless network communications unit being turned off.

2. The wireless network communications unit of claim 1, wherein the tag component determines whether the wireless network communications unit is turned off based on a user setting, and in response to detecting the wireless communications unit is turned off, entering the tag operational mode even if the host device is on.

3. The wireless network communications unit of claim 2, wherein the wireless network communications interface is configured to transmit and receive the data using the wireless network protocol when the host device is turned on and the wireless communications unit is turned on, wherein the wireless communications unit is operable to be turned on and off via the user setting.

4. The wireless network communications unit of claim 1, wherein the wireless network communications interface comprises an antenna transmitting and receiving radio frequency signals.

5. The wireless network communications unit of claim 1, wherein the tag component comprises a processor and a memory storing the data identifying a location of the host device.

6. The wireless network communications unit of claim 2, wherein the tag component is configured to connect the wireless network communications unit to a battery in response to detecting when the host device is turned off or detecting when the wireless network communications unit is turned off.

7. The wireless network communications unit of claim 6, wherein the battery is in the host device.

8. The wireless network communications unit of claim 6, wherein the battery is in the wireless network communications unit.

9. The wireless network communications unit of claim 1, wherein the wireless network communications unit is a network card.

10. The wireless network communications unit of claim 1, wherein the wireless network communications unit is a circuit internal to the host device.

11. The wireless network communications unit of claim 1, wherein the host device comprises a mobile computer.

12. The wireless network communications unit of claim 1, wherein the wireless network protocol comprises WiFi or BLUETOOTH.

13. The wireless network communications unit of claim 2, wherein when the host device is turned on and the wireless network communications unit is turned on, the host device is operable to send data via the wireless communications unit and receive data via the wireless communications unit; and
   when the wireless communications unit is operating in tag operational mode, only the data identifying the host device is operable to be transmitted from the wireless communications unit.

14. A computer system comprising:
   a processor;
   a memory; and
   a wireless network communications unit operable to transmit and receive data using a wireless network protocol, the unit including
      a wireless network communications interface configured to transmit and receive data using the wireless network protocol when a host device having the wireless network communications unit is turned on;
      a tag component detecting when the host device is turned off, and in response to detecting the host device being turned off or the wireless network communications unit being turned off, entering a tag operational mode wherein the tag component transmits data identifying the host device via the wireless network interface.

15. The computer system of claim 14, wherein the wireless network communications interface is configured to transmit and receive the data using the wireless network protocol when the host device is turned on and the wireless network communications unit is turned on.

16. The computer system of claim 15, wherein the tag component enters the tag operational mode when the wireless network communications unit is turned off.

17. A method of multimode operation of a wireless network communications unit for a host device, the method comprising:
   determining when the host device is turned on;
   using the wireless communications unit to transmit and receive data for the host device when the host device is turned on;
   determining when the wireless communications unit is turned off;
   in response to determining the host device is turned off or the wireless communications unit is turned off, entering a tag operational mode wherein the wireless communications unit transmits data identifying the host device.

18. The method of claim 17, further comprising:
   determining when the wireless communications unit is turned on based on a user setting; and
   using the wireless communications unit to transmit and receive data for the host device when the host device is turned on and the wireless communications unit is turned on.

* * * * *